(12) United States Patent
Katsumoto et al.

(10) Patent No.: US 10,473,946 B2
(45) Date of Patent: Nov. 12, 2019

(54) LENTICULAR DISPLAY BODY, METHOD FOR FORMING LENTICULAR IMAGE, AND METHOD FOR MANUFACTURING LENTICULAR DISPLAY BODY

(71) Applicant: FUJIFILM CORPORATION, Minato-ku, Tokyo (JP)

(72) Inventors: Ryuichi Katsumoto, Shizuoka (JP); Yanlong Che, Shizuoka (JP); Ryou Hibino, Shizuoka (JP); Masahiko Noritsune, Shizuoka (JP)

(73) Assignee: FUJIFILM CORPORATION, Tokyo (JP)

( * ) Notice: Subject to any disclaimer, the term of this patent is extended or adjusted under 35 U.S.C. 154(b) by 187 days.

(21) Appl. No.: 15/717,968

(22) Filed: Sep. 28, 2017

(65) Prior Publication Data

US 2018/0017802 A1    Jan. 18, 2018

Related U.S. Application Data

(63) Continuation of application No. PCT/JP2016/060752, filed on Mar. 31, 2016.

(30) Foreign Application Priority Data

Mar. 31, 2015   (JP) .................................. 2015-074481

(51) Int. Cl.
*G02B 27/22*   (2018.01)
*G03B 35/00*   (2006.01)
*H04N 1/00*    (2006.01)

(52) U.S. Cl.
CPC ......... *G02B 27/2214* (2013.01); *G03B 35/00* (2013.01); *H04N 1/00201* (2013.01)

(58) Field of Classification Search
CPC .. G02B 27/2214; G02B 27/22; G02B 27/225; H04N 13/305; H04N 1/00201
USPC ............................. 359/463; 348/59; 40/454
See application file for complete search history.

(56) References Cited

U.S. PATENT DOCUMENTS 5,543,965 A   8/1996  Bielinski et al.
6,366,281 B1  4/2002  Lipton et al.
(Continued)

FOREIGN PATENT DOCUMENTS

JP   H08-1922 A    1/1996
JP   H09-101749 A  4/1997
(Continued)

OTHER PUBLICATIONS

Extended European Search Report dated Mar. 9, 2018, issued in corresponding EP Patent Application No. 16773151.2.
(Continued)

*Primary Examiner* — Audrey Y Chang
(74) *Attorney, Agent, or Firm* — Solaris Intellectual Property Group, PLLC

(57) ABSTRACT

A lenticular display includes a lenticular image including an image strip group in which display image strips that are respectively extracted in the form of a stripe from a plurality of display images are arrayed adjacently to each other in their respective corresponding positions, and in which an interpolation image strip is disposed between display image strips that are adjacent to each other, that are extracted from different display images, and that have different colors in at least a portion thereof, the interpolation image strip having a color that is in between the color of one of the adjacent display image strips and the color of the other of the adjacent display image strips.

10 Claims, 13 Drawing Sheets

(56) References Cited

U.S. PATENT DOCUMENTS 7,839,430 B2 * 11/2010 Hentschke ........... G02B 27/225
                                                                   348/59
2002/0105483 A1    8/2002 Yamazaki et al.

FOREIGN PATENT DOCUMENTS

| JP | 11212024 A | * | 8/1999 |
|---|---|---|---|
| JP | H11-212024 A | | 8/1999 |
| JP | 2000-98948 A | | 4/2000 |
| JP | 2011-530134 A | | 12/2011 |
| JP | 2013-88494 A | | 5/2013 |
| JP | 2013-92650 A | | 5/2013 |

OTHER PUBLICATIONS

English language translation of the following: Office action dated Apr. 3, 2018 from the JPO in a Japanese patent Application No. 2017-510211 corresponding to the instant patent application. This office action translation is submitted now in order to supplement the understanding of the cited references disclosed in the instant Information Disclosure Statement.
International Search Report issued in International Application No. PCT/JP2016/060752 dated Jun. 28, 2016.
Written Opinion of the ISA issued in International Application No. PCT/JP2016/060752 dated Jun. 28, 2016.
English language translation of the following: Office action dated Jul. 2 2019 from the SIPO in a Chinese patent application No. 201680019751.5 corresponding to the instant patent application.

\* cited by examiner

Ai  Ai  Ai  Ai  Ai  Ei  Di  Di  Di  Di  Di  Ei

An  An  An  an  Cn  bn  Bn  Bn  Bn  bn  Cn  an

LENTICULAR DISPLAY BODY, METHOD FOR FORMING LENTICULAR IMAGE, AND METHOD FOR MANUFACTURING LENTICULAR DISPLAY BODY

CROSS-REFERENCE TO RELATED APPLICATION

This application is a continuation application of International Application No. PCT/JP2016/060752, filed Mar. 31, 2016, the disclosure of which is incorporated herein by reference in its entirety. Further, this application claims priority from Japanese Patent Application No. 2015-074481, filed Mar. 31, 2015, the disclosure of which is incorporated herein by reference in its entirety.

BACKGROUND OF THE INVENTION

1. Field of the Invention

The present disclosure relates to a lenticular display, a method for forming a lenticular image, and a method for manufacturing a lenticular display.

2. Description of Related Art

As a medium displaying different images depending on the viewing angle, a lenticular display is known in which a lenticular lens including convex lenses, which each have a semicylindrical surface and are arranged in parallel, is used.

Generally, in the lenticular display, an image strip group (lenticular image) obtained by combining a plurality of interlaced images is disposed on a rear surface side of the lenticular lens (an opposite surface of the convex lenses from the semicylindrical surface). When the image strip group is observed through the lenticular lens, depending on the observation angle, one kind or two or more kinds of images in the image strip group are displayed.

JP2000-98948A discloses an image display including a lenticular sheet corresponding to a lenticular lens and a sampling image synthesized using a plurality of images, in which crosstalk at the time of observation is reduced in a display method for stereoscopic images, animation, or changing images by incorporating and arraying images, which are obtained by extracting portions where there are no image changes, into an image array.

JP2011-530134A discloses a method for preparing a lenticular imaging material by superimposing a ghost-removing element formed to reduce the estimated ghost artifact on a plurality of source images, interlacing processed source images forming multiple spatial images, and attaching an optical element to the multiple spatial images.

SUMMARY OF THE INVENTION

FIG. 16 is a schematic view showing an example of two display images displayed by a lenticular display. FIG. 17 is a schematic view showing an example of an array of image strips in the region indicated by S in FIG. 16. FIG. 18 is a schematic view showing an example of the structure in a thickness direction of the lenticular display including an image strip group shown in FIG. 17, but illustration of some portions of the structure is omitted.

For example, in a case where a display image A (hereinafter, referred to as "image A" in some cases) and a display image B (hereinafter, referred to as "image B" in some cases) including different letters are separately displayed in one lenticular display as shown in FIG. 16, display image strips for displaying the respective display images A and B are respectively disposed (arrayed) in parallel in their respective corresponding positions on the opposite side (rear surface side) of convex lenses of the lenticular lens from the semicylindrical surface, thereby enabling changing, that is, switching of the display images depending on the viewing angle.

For example, in a case where the lenticular display includes a lenticular lens including N (N is an integer of 2 or greater) convex lenses arrayed in parallel, in the region indicated by S in FIG. 16 that is positioned under the n-th (n is any integer equal to or less than N) convex lens from one end in the direction in which the convex lenses are arrayed in parallel, an image strip An and an image strip Bn as shown in FIG. 17, which are stripe-shaped extracted divided images of the images A and B, respectively, are adjacently disposed in parallel in an interlaced arrangement. As shown in FIG. 18, under each of the first to the N-th convex lenses, image strips respectively extracted from the images A and B are disposed in parallel in their respective corresponding positions, similarly to the case of the n-th convex lens (that is, an interlaced image strip group $200n$ is disposed). Depending on the angle at which the observer looks at through the lenticular lens, the image A is displayed as a result of the image strips extracted from the image A being synthesized, or the image B is displayed as a result of the image strips extracted from the image B being synthesized.

In this way, the image strips that produce the changing effect are interlaced such that one image is adjacent to the other image, and the interlaced images are consecutively arrayed for each of the convex lenses of the lenticular lens. Accordingly, there is a boundary at which the image A switches to the image B or the image B switches to the image A.

For example, in a case where a lenticular display in which the longitudinal direction of convex lenses is oriented in an anteroposterior direction is observed with both eyes in a lateral movement, there is an angle at which different images are observed by the left and right eyes (left eye: image A, right eye: image B, or vice versa), and image failure occurs at the angle. Particularly, in a case where each of the images includes a letter, it is difficult to recognize the letters.

Furthermore, for example, in a case where an observer observes a lenticular display while moving relative to the lenticular display, the observer perceives both letters and cannot read the letters at a point at which one letter switches to the other letter.

In addition, in a case where the colors (hue, brightness, chroma) of the images A and B are greatly different from each other, the greatly different images are perceived with the respective eyes, as a result of which the legibility is further deteriorated.

For example, a lenticular display (image display) disclosed in JP2000-98948A is based on the premise that a portion where no image change occurs is present in the background of a plurality of images displayed, and hence the lenticular display cannot be applied to images other than those having a portion with no image changes in the background. Further, in a case where portions with image changes have a large area, crosstalk cannot be eliminated, and hence an image display in which image changes occur in a large area in a natural manner cannot be obtained.

Furthermore, in the method for preparing a lenticular imaging material disclosed in JP2011-530134A, complicated steps are necessary for removing ghost artifact.

An object of the present disclosure is to provide a lenticular display in which displaying of overlapping plural display images, which makes difficult the recognition of images, is reduced, a method for forming a lenticular image, and a method for manufacturing a lenticular display.

In order to achieve the above object, the invention as described below is provided.

<1> A lenticular display comprising a lenticular lens including a plurality of convex lenses that each have a semicylindrical surface and are arrayed in parallel, and a lenticular image disposed on an opposite side of the convex lenses from the semicylindrical surface, in which the lenticular image includes:

a plurality of display image strips that are respectively extracted in the form of a stripe from a plurality of display images and arrayed under the convex lenses in their respective corresponding positions; and an interpolation image strip disposed between display image strips that are adjacent to each other, that are extracted from different display images, that are included in the plurality of display image strips, and that have mutually different colors in at least a portion thereof, and, in a position where the colors of the adjacent display image strips are different from each other, the interpolation image strip has a color that is in between the color of one of the adjacent display image strips and the color of the other of the adjacent display image strips.

<2> The lenticular display as described in <1>, in which the interpolation image strip includes an interpolation image strip in which each of hue, brightness, and chroma as elements constituting the Munsell color system is in between those of the respective colors of the adjacent display image strips.

<3> The lenticular display as described in <1> or <2>, in which the interpolation image strip includes a plurality of interpolation image strips that are disposed such that each of hue, brightness, and chroma as elements constituting the Munsell color system stepwise changes in a direction from the color of one of the adjacent display image strips to the color of the other of the adjacent display image strips.

<4> The lenticular display as described in any one of <1> to <3>, in which the plurality of display images each include a letter.

<5> A method for forming a lenticular image, comprising a step of making an image strip group, the step of making an image strip group including: adjacently disposing display image strips that are respectively extracted in the form of a stripe from a plurality of display images in their respective corresponding positions, and disposing an interpolation image strip between display image strips that are adjacent to each other, that are extracted from different display images, and that have different colors in at least a portion thereof, the interpolation image strip having a color that is in between the color of one of the adjacent display image strips and the color of the other of the adjacent display image strips.

<6> The method for forming a lenticular image as described in <5>, in which the interpolation image strip includes an interpolation image strip in which each of hue, brightness, and chroma as elements constituting the Munsell color system is in between those of the respective colors of the adjacent display image strips.

<7> The method for forming a lenticular image as described in <5> or <6>, in which the interpolation image strip includes a plurality of interpolation image strips that are disposed such that each of hue, brightness, and chroma as elements constituting the Munsell color system stepwise changes in a direction from the color of one of the adjacent display image strips to the color of the other of the adjacent display image strips.

<8> The method for forming a lenticular image as described in any one of <5> to <7>, in which the plurality of display images each include a letter.

<9> A method for manufacturing a lenticular display, comprising a step of forming a lenticular image on a surface of a recording medium by the method described in any one of <5> to <8>, and a step of bonding a surface of the recording medium on which the lenticular image has been formed and a surface of a lenticular lens including a plurality of convex lenses that each have a semicylindrical surface and are arrayed in parallel, the surface of the lenticular lens being at an opposite side from the semicylindrical surface.

<10> A method for manufacturing a lenticular display, comprising a step of forming a lenticular image by the method described in any one of <5> to <8>, on a surface of a lenticular lens including a plurality of convex lenses that each have a semicylindrical surface and are arrayed in parallel, the surface of the lenticular lens being at an opposite side from the semicylindrical surface of the convex lenses.

According to the present disclosure, there is provided a lenticular display in which displaying of overlapping plural display images, which makes difficult the recognition of images, is reduced, a method for forming a lenticular image, and a method for manufacturing a lenticular display.

DESCRIPTION OF EMBODIMENTS

Hereinafter, embodiments of the present disclosure will be specifically described with reference to the attached drawings, but the present invention is not limited to the embodiments described below. In the embodiments described below, repeated descriptions or references will be omitted in some cases.

A lenticular display according to an embodiment of the present disclosure includes a lenticular lens including a plurality of convex lenses (hereinafter, referred to as "lenses" in some cases) that each have a semicylindrical surface and are arrayed in parallel, and a lenticular image disposed on an opposite side of the convex lenses from the semicylindrical surface, in which the lenticular image includes:

a plurality of display image strips that are respectively extracted in the form of a stripe from a plurality of display images and arrayed under the convex lenses in their respective corresponding positions; and an interpolation image strip disposed between display image strips that are adjacent to each other, that are extracted from different display images, that are included in the plurality of display image strips, and that have mutually different colors in at least a portion thereof, and, in a position where colors of the adjacent display image strips are different from each other, the interpolation image strip has a color that is in between the color of one of the adjacent display image strips and the color of the other of the adjacent display image strips.

Figure 1:
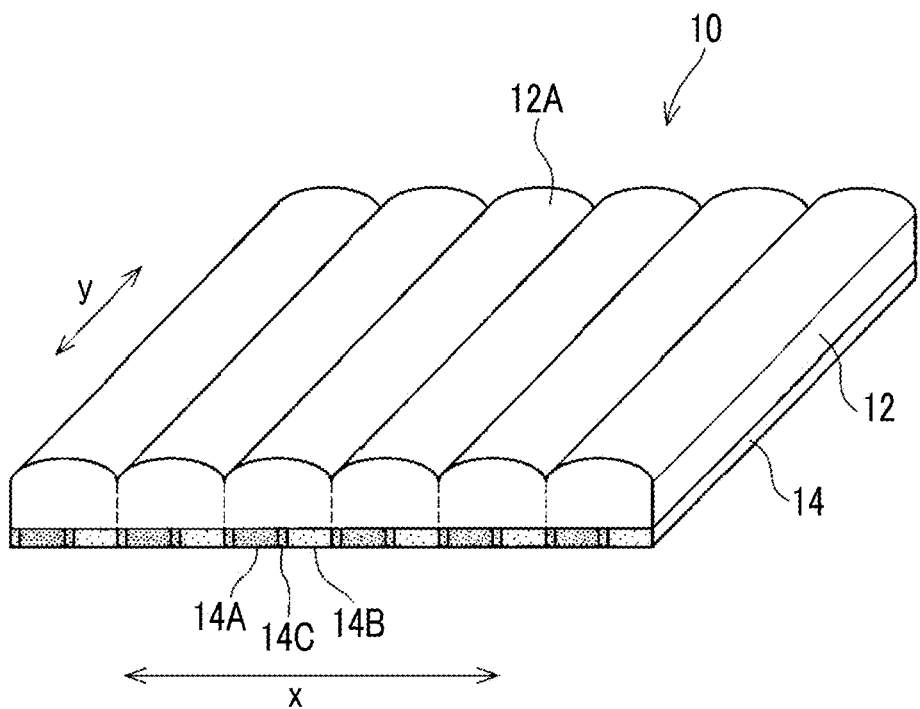
FIG. 1 is a schematic view showing an example of a lenticular display according to the present disclosure.

FIG. 1 is a schematic view showing an example of the lenticular display according to the present disclosure. A lenticular display 10 shown in FIG. 1 has a lenticular lens 12 including a plurality of convex lenses 12A that each have a semicylindrical surface and are arrayed in parallel, and a lenticular image 14 disposed on an opposite side (hereinafter, referred to as "rear surface side" in some cases) of the convex lenses 12A of the lenticular lens 12 from the semicylindrical surfaces.

Herein, the meaning of terms in the present specification will be described.

"Display image" means an image intended to be displayed by the lenticular display, that is, an image intended to be recognized by an observer when the observer observes the lenticular display from the lenticular lens side.

"Interpolation image" means an image that may be displayed while one display image is switching to another display image in accordance with a change in the angle at which the observer observes the lenticular display, the displaying of the interpolation image being not the inherent purpose of the interpolation image.

"Image strip" means a belt-shaped image that is disposed under the lenticular lens in a direction parallel to the longitudinal direction of the lens and that forms a portion of a display image or an interpolation image.

"Display image strip" means an image strip that is extracted in the form of a stripe from a display image and that forms a portion of the display image.

"Interpolation image strip" means an image strip disposed between display image strips that are adjacent to each other and that have mutually different colors in at least a portion thereof, the image strip having a color that is in between the color of one of the adjacent display image strips and the color of the other of the adjacent display image strips.

"Display image array" means a group of a plurality of the same display image strips that are arrayed under one lens in a width direction of the lens.

"Image strip group" means a group of image strips disposed under one lens.

"Display image strips that are adjacent to each other" mean two display image strips that are respectively extracted from different display images and arrayed adjacently to each other under one convex lens or adjacent convex lenses. The adjacent display image strips do not have to contact with each other.

"Color that is in between the color of one of the adjacent display image strips and the color of the other of the adjacent display image strips" that the interpolation image strip has means a color (hereinafter, described as "interpolation color" in some cases) obtained by changing at least one of hue, brightness, or chroma of one of the adjacent display image strips so as to come closer to that/those of the other of the adjacent display image strips, the hue, brightness, and chroma being elements (attribute) constituting the Munsell color system which will be described later. Each position in the interpolation image strip disposed between the adjacent display image strips has a color obtained by changing the at least one element (attribute) selected from hue, brightness, or chroma at its corresponding position in the same ratio toward the adjacent display image strip.

(Lenticular Lens)

The lenticular lens has a configuration in which a plurality of convex lenses are arrayed in parallel, the convex lenses each having a semicylindrical surface at a side from which the lenticular display according to the present embodiment is observed. The lenticular lens is formed of a light-transmitting resin.

Examples of the resin constituting the lenticular lens 12 include a polymethyl methacrylate resin (PMMA), a polycarbonate resin, a polystyrene resin, a methacrylate-styrene copolymer resin (MS resin), an acrylonitrile-styrene copolymer resin (AS resin), a polypropylene resin, a polyethylene resin, a polyethylene terephthalate resin, a glycol-modified polyethylene terephthalate resin, a polyvinyl chloride resin (PVC), a thermoplastic elastomer, a copolymer of these, a cycloolefin polymer, and the like. Considering the ease of melt extrusion, it is preferable to use a resin having low melt viscosity, such as a polymethyl methacrylate resin (PMMA), a polycarbonate resin, a polystyrene resin, a methacrylate-styrene copolymer resin (MS resin), a polyethylene resin, a polyethylene terephthalate resin, or a glycol-modified polyethylene terephthalate resin. It is more preferable to use a glycol-modified polyethylene terephthalate resin because the use of a glycol-modified polyethylene terephthalate resin facilitates easy transfer of the lens shape formed on the surface of an embossing roller and reduces cracking of the lens layer at the time of embossing. The lenticular lens 12 may include a plurality of resins.

(Lenticular Image)

The lenticular image 14 is constituted with image strip groups each including display image strips 14A and 14B for separately displaying two display images, and an interpolation image strip 14C disposed between the adjacent display image strips 14A and 14B. Specifically, the display image strips 14A and 14B respectively extracted, in the form of a stripe, from the display images are adjacently arrayed for each convex lens 12A provided in the corresponding position. The interpolation image strip 14C is disposed between the adjacent display image strips 14A and 14B, and, in a position where colors of the adjacent display image strips 14A and 14B are different from each other, the interpolation image strip has a color (interpolation color) that is in between the color of one of the adjacent display image strips 14A and 14B and the color of the other of the adjacent display image strips 14A and 14B.

Figure 2:
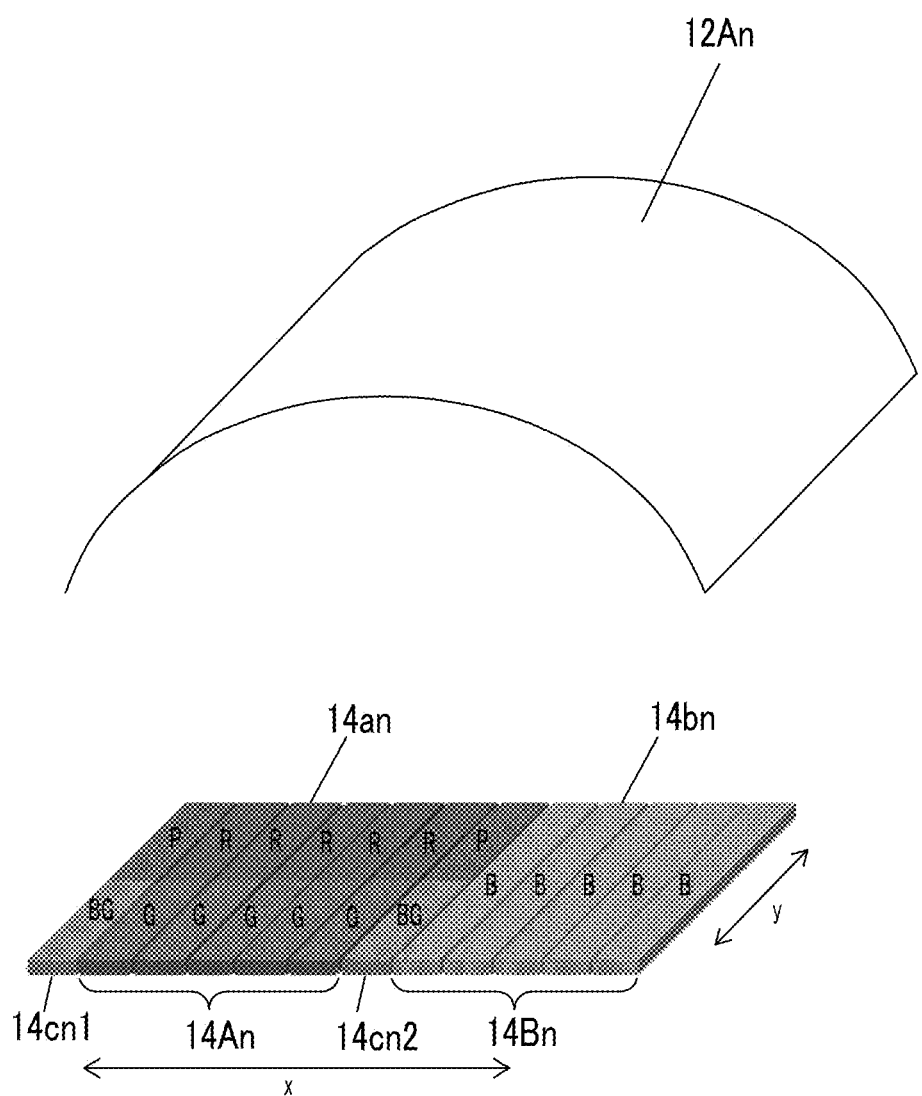
FIG. 2 is a schematic view showing an example of an image strip group disposed under one lens in a lenticular display according to the present disclosure.
Figure 3:
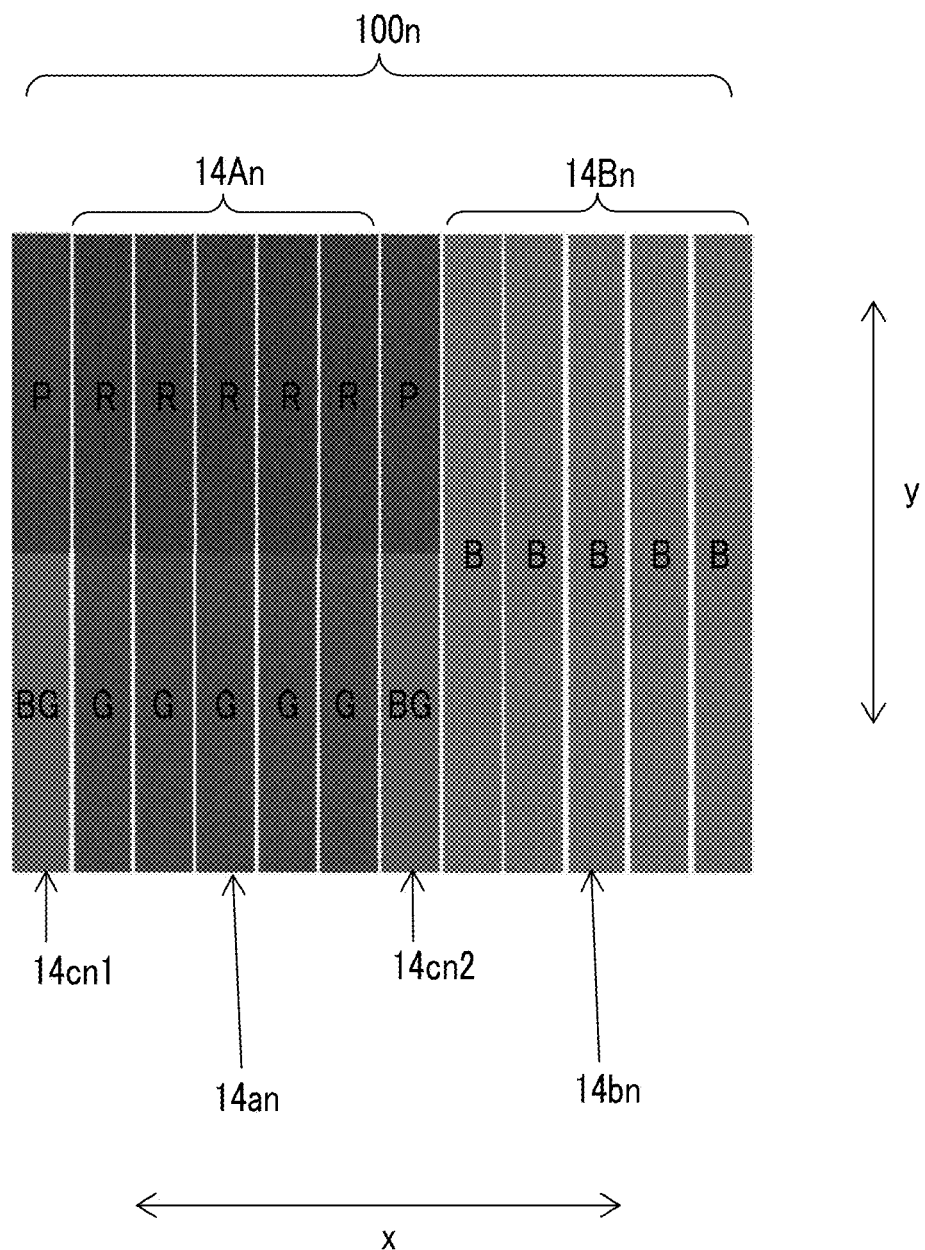
FIG. 3 is a schematic plan view showing an image strip group shown in FIG. 2.

FIG. 2 is a schematic perspective view showing an example of an image strip group disposed under one lens (the nth lens) 12An in the lenticular display of the present disclosure. FIG. 3 is a schematic plan view showing the image strip group. The x-direction represents a width direction of the lens, and the y-direction represents a longitudinal direction of the lens.

In the present embodiment, an image strip group 100n is disposed under one lens, the image strip group 100n including twelve image strips which are each disposed in parallel to the longitudinal direction y of the lens and are arrayed in the width direction of the lens. The image strip group 100n is constituted with a first display image array 14An including five first display image strips 14an arrayed in parallel, a second display image array 14Bn including five second display image strips 14bn arrayed in parallel, and two interpolation image strips 14cn1 and 14cn2.

Each of the first display image strips 14an is divided along the longitudinal direction y according to color and has a red portion (abbreviated to "R" in some cases) and a green portion (abbreviated to "G" in some cases). The second display image strips 14bn are blue (abbreviated to "B" in some cases).

In contrast, in the interpolation image strips 14cn1 and 14cn2, a position corresponding to a location between R portion of the adjacent first display image strip 14an and the adjacent second display image strip 14bn is purple (abbreviated to "P" in some cases), which is in between R and B, and a position corresponding to a location between G portion of the first display image strip 14an and the second display image strip 14bn is blue-green (abbreviated to "BG" in some cases), which is in between G and B.

Herein, the Munsell color system will be described. The Munsell color system is one of the color systems quantitatively describing colors, specifies colors using three attributes (hue, brightness, and chroma) of colors, and is standardized as JIS Z 8721 (method for specifying color using three attributes). Hue is a difference in appearance between colors such as red, yellow, green, blue, and purple. Brightness means the lightness of color, and chroma means the vividness of color.

Figure 4:
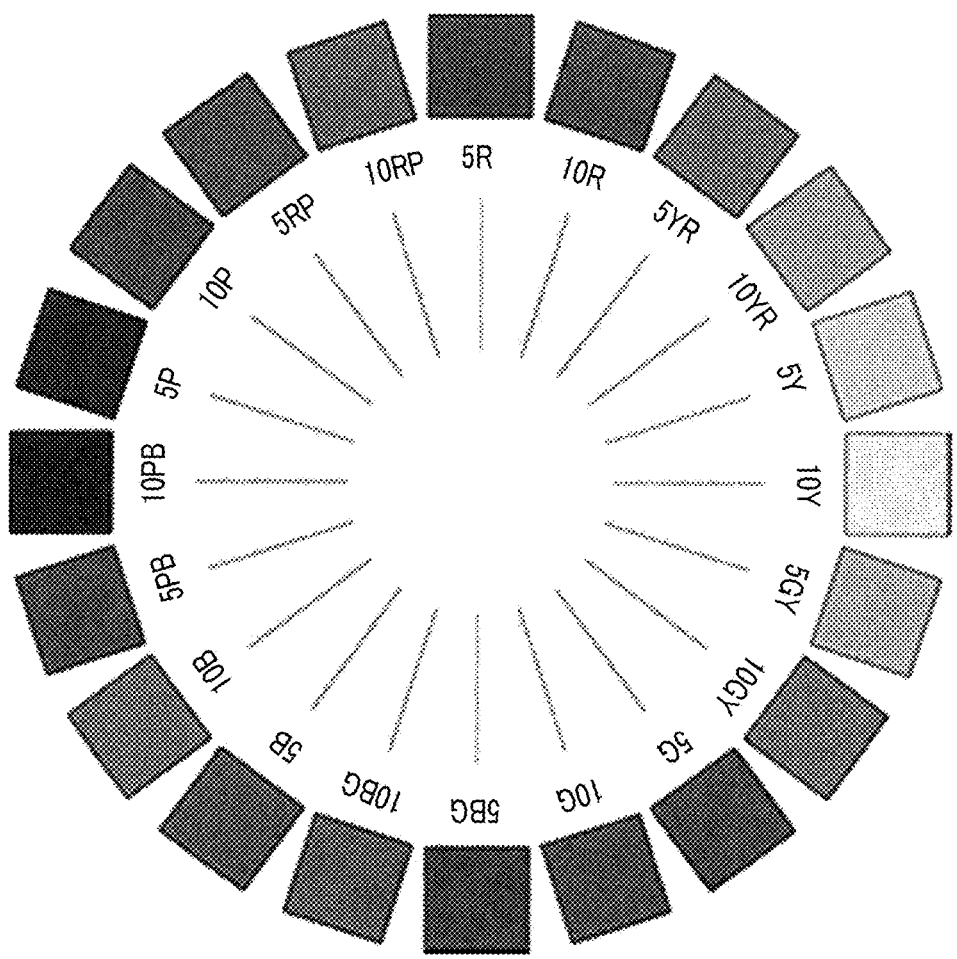
FIG. 4 is a view showing an example of a hue circle of the Munsell color system.

FIG. 4 shows an example of the Munsell hue circle. In FIG. 4, the symbols mean R: red, YR: yellow red, Y: yellow, GY: green yellow, G: green, BG: blue green, B: blue, PB: purple blue, P: purple, and RP: red purple. In the hue circle shown in FIG. 4, although hues obtained by subdividing each of the ten hues into two hues (for example, R is subdivided into 5R and 10R) are illustrated, one hundred hues can be obtained by subdividing each of the hues into ten hues (for example, R can be subdivided into 1R to 10R).

Regarding hue, the interpolation color of the interpolation image strip 14c, that is, the color which is in between the color of one of the adjacent display image strips and the color of the other of the adjacent display image strips, means hue disposed on a side where the length of an arc between one color and the other color in the hue circle shown in FIG. 4 is the shorter. For example, in a case where the hue of the first display image strip 14an is 5R, and the hue of the second display image strip 14bn is 5B, the hue positioned on the arc starting from 5R, passing through 5P, and reaching 5B is the hue that the interpolation image strip disposed between the first display image strip and the second display image strip can adopt.

In contrast, for example, in a case where the hue of first display image strip is 5R and the hue of the second display image strip is 5BG, 5R and 5BG are in opposite positions across the center of the hue circle, and the arc of the 10PB side and the arc of the 10Y side have the same length. In this case, although the interpolation image strip can adopt any hue except for 5R and 5BG, it is preferable to adopt the hue in between the wavelengths of 5R and 5BG, that is, the hue positioned on the arc at the 10Y side.

Figure 5:
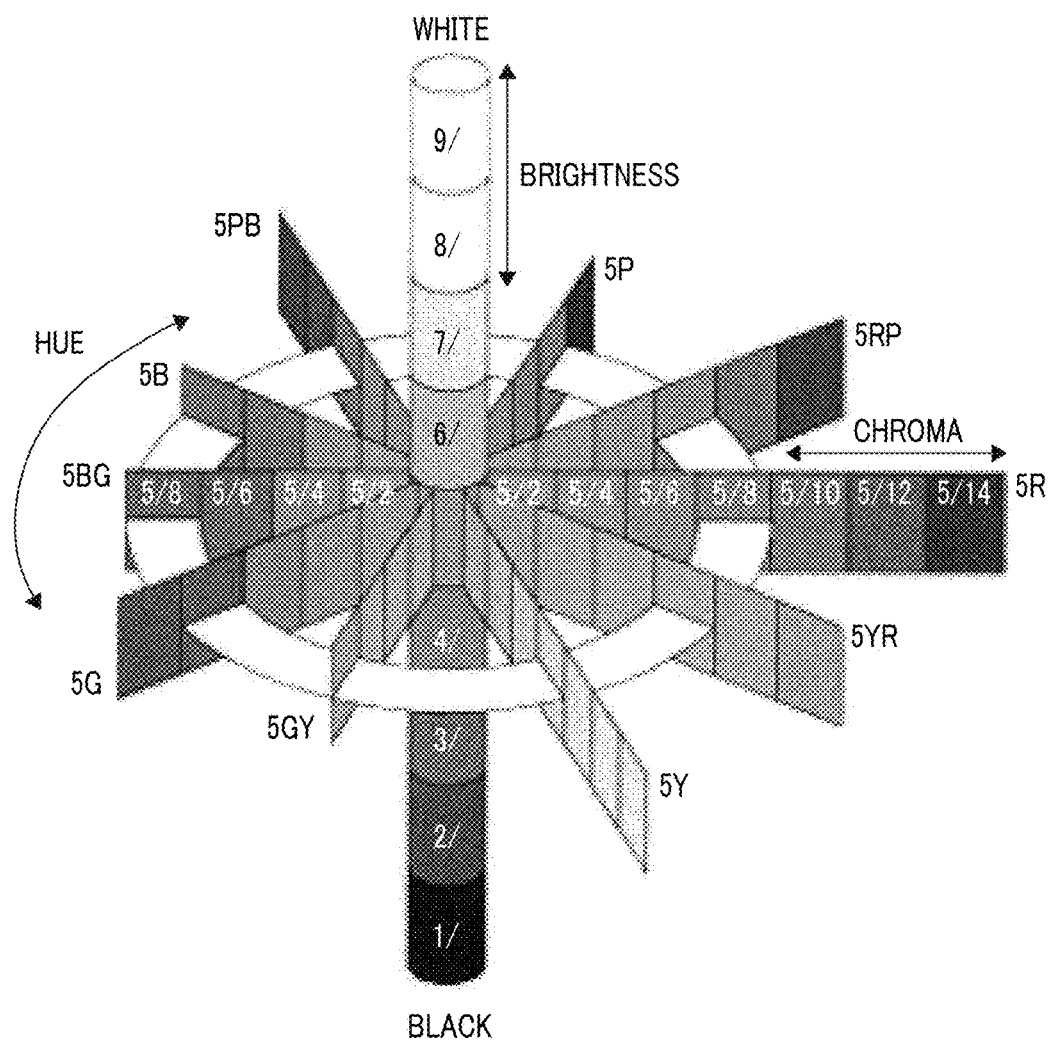
FIG. 5 is a view showing an example of a color solid systematized including all of hue, brightness, and chroma in the Munsell color system.

FIG. 5 shows a color solid systematized including all of the hue, brightness, and chroma in the Munsell color system.

Regarding brightness, white, which is the brightest among the achromatic colors, is assigned a brightness of 10, black, which is the darkest among the achromatic colors is assigned a brightness of 0, and the colors with lightness in between them, that is, greys are assigned numbers from 1 to 9. Regarding chroma, neutral colors are assigned 0, and the number is increased according to the degree of vividness of color. The maximum value of chroma varies with hue and brightness described above. The maximum value of chroma is greatest (14) for 5R, and is smallest (10) for 5BG.

The three attributes of color can be collectively expressed as "hue brightness/chroma". For example, in a case where hue is 5R, brightness is 4, and chroma is 10, the color is expressed as 5R 4/10. As the color (interpolation color) of the interpolation image strip, for example, it is possible to select a color (intermediate color) of which all of the three attributes are in between the color of the first display image strip and the color of the second display image strip.

In the image strip group under the n-th lens shown in FIGS. 2 and 3 described above, the two interpolation image strips 14cn1 and 14cn2 have the same color arrangement based on the assumption that the second display image strip (not shown in the drawing) disposed under a lens (the (n−1)th lens) located adjacently at the first display image array side is also blue (B). However, the interpolation color of the interpolation image strip is a color determined by the colors at the corresponding positions in the adjacent display image strips between which the interpolation image strip is disposed.

In a case where one of the display image strips is red (for example, 2.5R), the sum of brightness and chroma thereof is preferably equal to or greater than 16, and more preferably equal to or greater than 18. The chroma of the color of the other display image strip is preferably equal to or lower than 3, more preferably equal to or lower than 2, and most preferably equal to or lower than 1.

In a case where one of the display image strips is green (for example, 2.5 G), the brightness thereof is preferably equal to or higher than 6, and the chroma thereof is preferably equal to or higher than 8 and most preferably equal to or higher than 10. The chroma of the color of the other display image strip is preferably equal to or lower than 3, more preferably equal to or lower than 2, and most preferably equal to or lower than 1.

In a case where one of the display image strips is blue (for example, 5PB), the brightness thereof is preferably equal to or higher than 5, and the chroma thereof is preferably equal to or higher than 12. The chromate of the color of the other display image strip is preferably equal to or lower than 3, more preferably equal to or lower than 2, and most preferably equal to or lower than 1.

Figure 6:
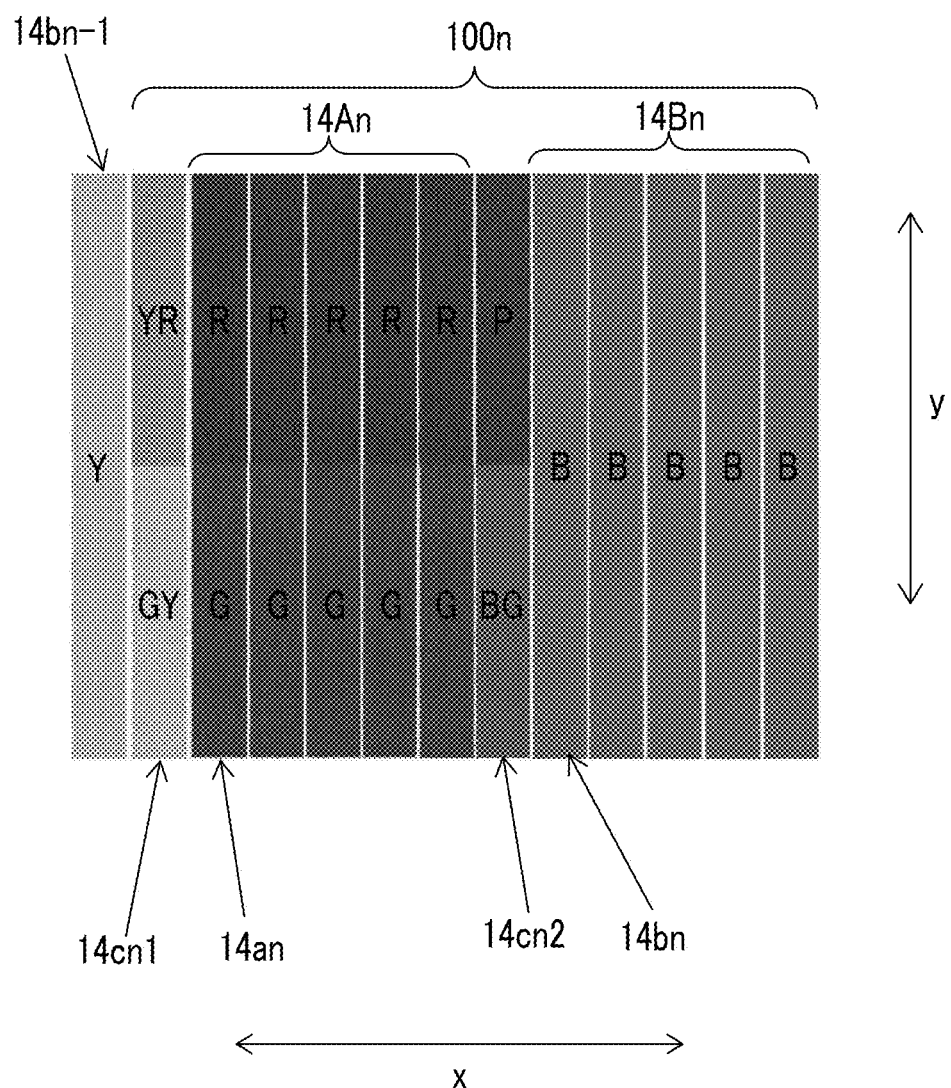
FIG. 6 is a schematic plan view showing another example of the image strip group.

FIG. 6 shows an example in which a second display image strip 14$bn$-1 under the (n-1)th lens, which is adjacently located at a side at which the first display image array 14An under the n-th lens is provided, is yellow (Y). In this case, the first interpolation image strip 14$cn$1 disposed between the second display image strip (Y) 14$bn$-1 under the (n-1)th lens and the first display image strip (R and G) 14$an$ under the n-th lens is yellow red (YR) between the second display image strip (Y) 14$bn$-1 under the (n-1)th lens and R portion of the first display image strip 14$an$ under the n-th lens, and is green yellow (GY) between the second display image strip (Y) 14$bn$-1 under the (n-1)th lens and G portion of the first display image strip 14$an$ under the n-th lens.

Figure 7:
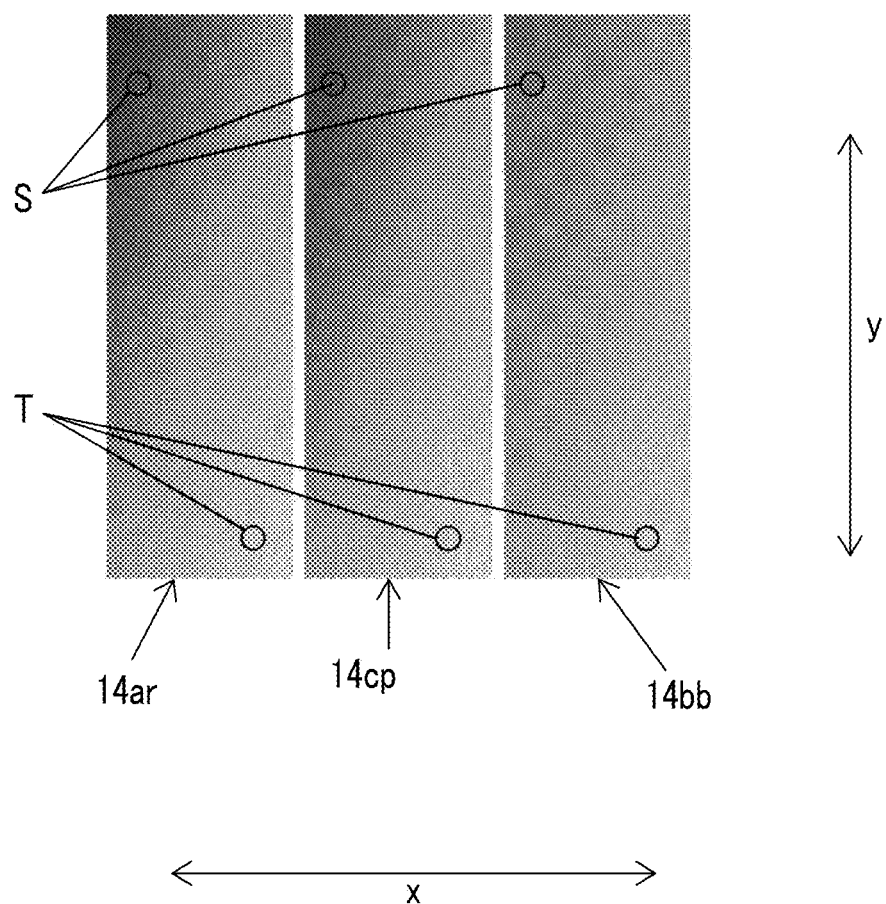
FIG. 7 is a schematic view showing an example of an image strip group including two display image strips each having a color that changes along a longitudinal direction y and a width direction x of the lens, and an interpolation image strip disposed between the two display image strips.

The color of each of the display image strips shown in FIGS. 3 and 6 does not change in the width direction x, and the color of the interpolation image strip disposed between the first display image strip and the second display image strip does not change in the width direction x. However, in a case where the color of each of the display image strips changes in the width direction x, the interpolation image strip has an interpolation color determined in accordance with the color change in the display image strip. FIG. 7 shows an example in which a first display image strip 14$ar$ (a shade of red) and a second display image strip 14$bb$ (a shade of blue), which are adjacent to each other, each exhibit a color change in each of the width direction x and the longitudinal direction y. Each position in an interpolation image strip 14$cp$ (a shade of purple) disposed between the first display image strip 14$ar$ and the second display image strip 14$bb$ has an interpolation color that is in between colors of the corresponding positions in the two display image strips. For example, in each of the positions indicated by S and T, the interpolation image strip 14$cp$ has an interpolation color that is in between the colors in the two display image strips.

As described above, an interpolation image strip having a color (interpolation color) that is in between the color of the first display image strip and the color of the second display image strip correspondingly to the positions is disposed between the first display image strip and the second display image strip that are adjacent to each other. Due to this configuration, in a case where the angle at which an observer observes the lenticular display changes, the first display image and the second display image switch to each other through the interpolation image. Accordingly, difficulty in recognizing an image due to an overlap of two display images is reduced.

The lenticular image 14 of the present embodiment can be formed by making image strip groups, each image strip group including display image strips that are respectively extracted in the form of a stripe from a plurality of display images and that are arrayed adjacently to each other in their respective corresponding positions, and an interpolation image strip disposed between display image strips that are adjacent to each other, that are extracted from different display images, and that have different colors in at least a portion thereof, the interpolation image strips having a color that is in between the color of one of the adjacent display image strips and the color of the other of the adjacent display image strips.

The interpolation image strip disposed between the adjacent display image strips under each convex lens may have a color (interpolation color) that is in between the color of one of the adjacent display image strips and the color of the other of the adjacent display image strips, and the method for preparing each interpolation image strip is not particularly limited. For example, it is preferable to use a method including: preparing an interpolation image by changing, in the same ratio, the color of one of the two original display images, from which adjacent display image strips are to be extracted in the form of a stripe, so as to come closer to the color of the other of the adjacent display image strips; and producing, from the interpolation image, interpolation image strips that are each to be disposed between adjacent display image strips at their respective corresponding positions. The interpolation image may be prepared only from portions that change upon switching between the display images, or prepared from the entire image including portions that do not change upon switching between the display images.

The lenticular image 14 may be formed on a recording medium disposed on the rear surface side of the lenticular lens, or may be directly formed on the rear surface (smooth surface) of the lenticular lens.

For instance, the lenticular display according to the present embodiment can be manufactured by:

forming an image layer having a lenticular image that is formed on a surface of a recording medium such as paper or plastic by the aforementioned method; and bonding the surface of the recording medium on which the lenticular image has been formed and a surface of the lenticular lens, for example, with a transparent adhesive layer provided therebetween or without any adhesive layer, the lenticular lens including a plurality of convex lenses that each have a semicylindrical surface and are arrayed in parallel, and the surface of the lenticular lens being at an opposite side from the semicylindrical surface.

Hereinafter, the lenticular display and the method for forming a lenticular image according to embodiments of the present disclosure will be more specifically described.

Figure 8:
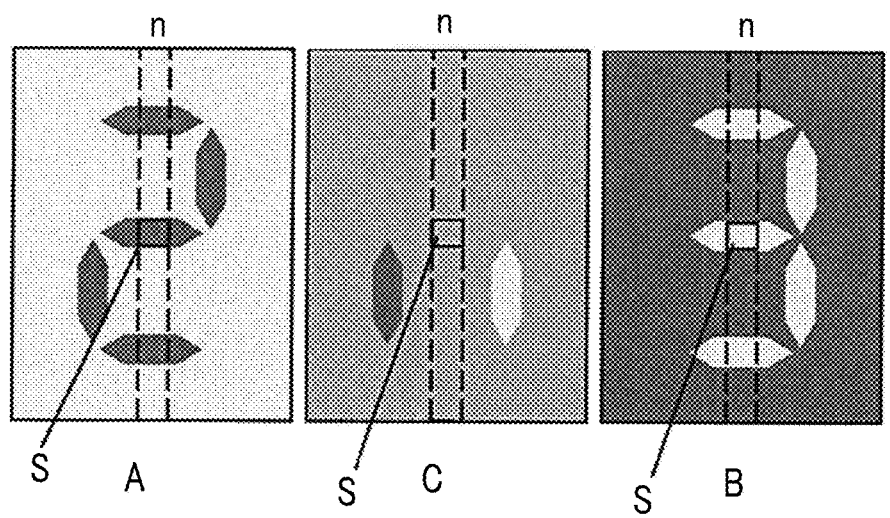
FIG. 8 is a schematic view showing an example of two display images to be separately displayed and an interpolation image produced from the two display images in an example of the lenticular display according to the present disclosure.
Figure 9:
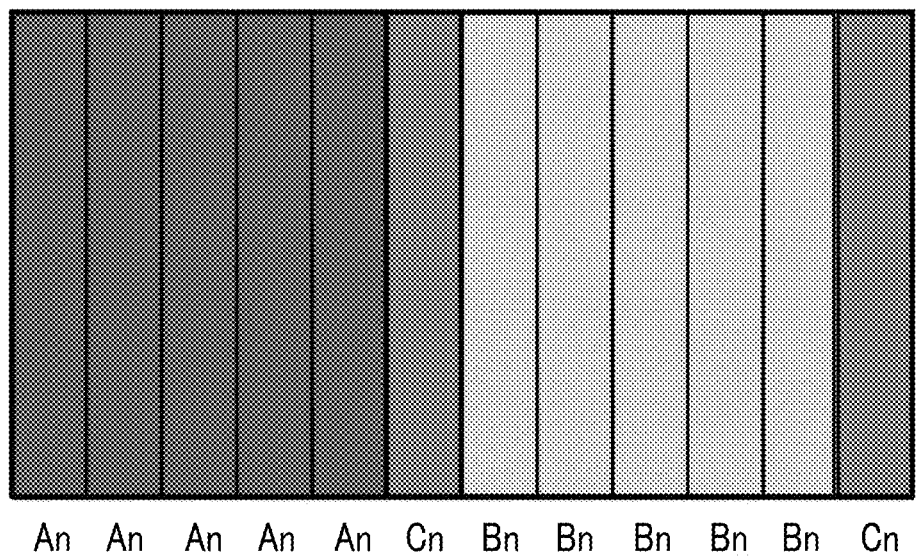
FIG. 9 is a schematic view showing an example of an image strip group (an interlaced image strip group for one lens) in the region indicated by S in FIG. 8.
Figure 10:
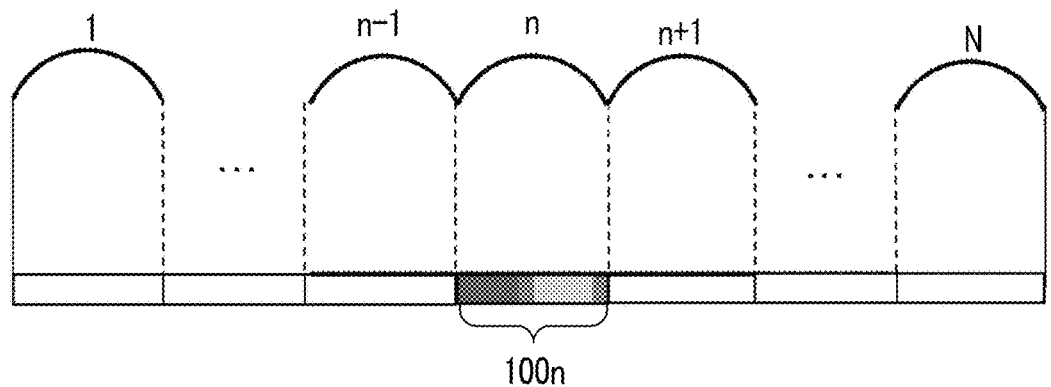
FIG. 10 is a schematic view showing an example of the structure in a thickness direction of the lenticular display including the image strip group shown in FIG. 9.

FIG. 8 is a schematic view showing an example of two display images to be separately displayed by an example of the lenticular display according to the present embodiment, and an interpolation image produced from the two display images. FIG. 9 is a schematic view showing an example of an image array in the region indicated by S in FIG. 8. FIG. 10 is a schematic view showing an example of the structure in a thickness direction of the lenticular display including the image strip group 100$n$ shown in FIG. 9, but the illustration of some portions is omitted.

The display image A (image A) and the display image B (image B) shown in FIG. 8 are different from each other in the color of the letter and the background color, and exhibit a great image change except for some portions of the letters included in the images A and B. The interpolation image C is produced from the images A and B. The positions (portions of each letter) in the interpolation image C where no color change occurs during the switching between the images A and B has the same colors as those of the corresponding positions of the images A and B, and other portions of the interpolation image C each have a color that is in between the colors in the images A and B.

The interpolation image C made from the images A and B has a color (interpolation color) that is in between colors of the corresponding positions in the display images A and B. Examples of the interpolation image C include an interpolation image obtained by shifting, in the same ratio, one or more of hue, brightness, or chroma—the elements (attributes) constituting the Munsell color system—of the colors of all the pixels constituting one of the images closer to those of the other image. An interpolation image C in which each of hue, brightness, and chroma—the elements constituting the Munsell color system—is closer to the midpoint between the image A and the image B is more preferred.

In the lenticular display according to the present embodiment, the lenticular image under the lenticular lens includes display image strips that are extracted by dividing each of the display images A and B into strips and arrayed for the respective convex lenses at the corresponding positions, whereby switching between the display images A and B occurs depending on the viewing angle when the lenticular display is observed from the lenticular lens side. Furthermore, an interpolation image strip is provided between the adjacent display image strips respectively extracted from the display images A and B, the interpolation image strip being extracted, in the form of a stripe, from the corresponding position in the interpolation image C. In a case where one interpolation image strip is disposed between adjacent display image strips, each of hue, brightness, and chroma—the elements constituting the Munsell color system—of the interpolation image strip is in between those of the colors of the adjacent display image strips, so that the display image can be recognized even when one of the display images and the interpolation image are together observed in the overlapped state.

For example, in the region indicated by S, located in a position corresponding to the n-th convex lens, in each of the images A and B in FIG. 8, an image strip Cn extracted from its corresponding position in the interpolation image C is disposed between image strips An extracted from the image A and image strips Bn extracted from the image B as shown in FIG. 9. An image strip Cn extracted from its corresponding position in the interpolation image C is also disposed on the (n+1)th convex lens side of image strips Bn arrayed under the n-th convex lens. In addition, under the (n−1)th convex lens and the (n+1) the convex lens, image strips respectively extracted from their corresponding positions in the images A, B, and C are disposed in a parallel arrayed state. Due to the arrangement described above, an interpolation image strip Cn−1 is disposed between image strips Bn−1 and image strips An, an interpolation image strip Cn is disposed between image strips Bn and image strips An+1, and image strips are also arrayed in a similar manner under other convex lenses.

In a case where the lenticular image formed of the aforementioned image strip groups is observed from the lenticular lens side, only the display image A or only the display image B is displayed depending on the observation angle. There are also an angle at which an overlapped image of the image A and the interpolation image C is displayed and an angle at which an overlapped image of the image B and the interpolation image C is displayed, but there is practically or absolutely no angle at which the observer has a difficulty in recognizing letters due to about fifty-fifty blend of the image A and the image B. In a case where the image A and the interpolation image C overlap each other, the displayed image is close to the image A, and in a case where the image B and the interpolation image C overlap each other, the displayed image is close to the image B. Therefore, for example, in a case where the display images A and B each include a letter, the lenticular display according to the present embodiment can improve legibility.

In FIGS. 8 to 10, twelve image strips are arrayed under one convex lens. However, in the present embodiment, the number of image strips arrayed under one convex lens is not limited as long as it is equal to or greater than 3. The greater the number of image strips arrayed under one convex lens, the higher the resolution, but data volume of the image stripe group increases. Therefore, the number of image strips arrayed under one convex lens is preferably from 3 to 12.

Figure 11:
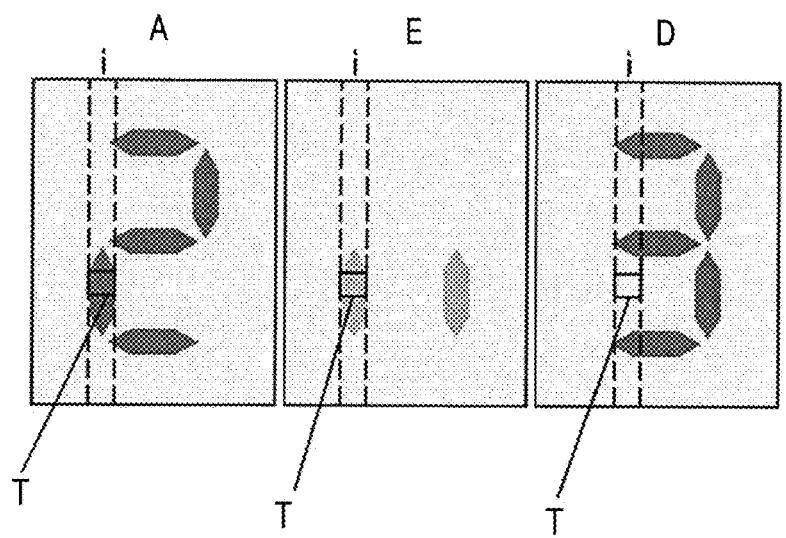
FIG. 11 is a schematic view showing an example of two display images to be separately displayed and an interpolation image produced from the two display images in an example of the lenticular display according to the present disclosure.
Figure 12:
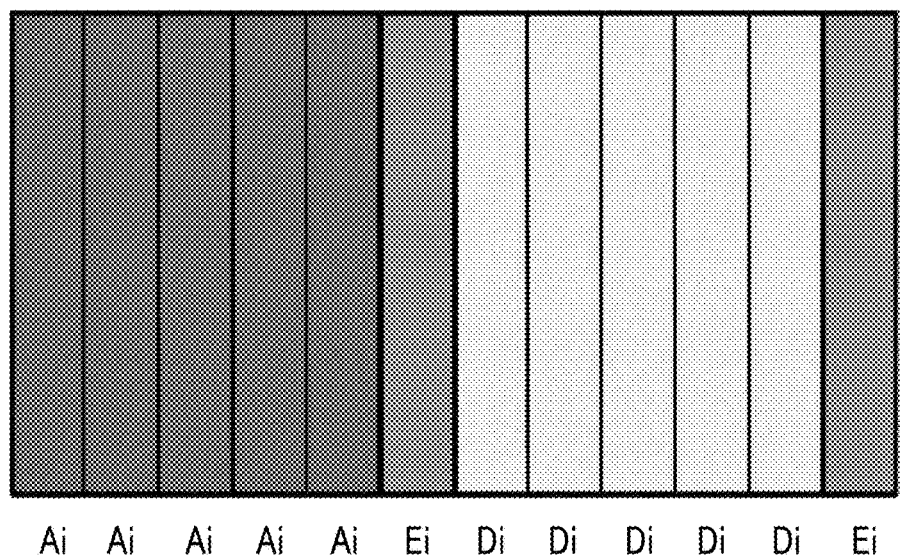
FIG. 12 is a schematic view showing an example of an image strip group (an interlaced image strip group for one lens) in the region indicated by T in FIG. 11.

FIG. 11 is a schematic view showing an example of two display images to be separately displayed in another example of the lenticular display according to the present embodiment, and an interpolation image made from the two display images. FIG. 12 is a schematic view showing an example of the image array for the region indicated by T in FIG. 11.

The lenticular display according to the present embodiment aims to display a display image A or a display image D depending on the viewing angle. Although the display images A and D include different letters, the color of the letters and the background color thereof are the same. Upon switching between the display image A and the display image D, only some portions of the letters included in each of the display images A and D show changes.

An interpolation image E is made based on the display image A and the display image D, and, only in the portions that show changes upon switching between the display image A and the display image D, the interpolation image E has a color of which the elements (attributes) of hue, brightness, and chroma are in between those of colors of the display images E and D. For example, in the region indicated by T under the i-th (i is any integer) convex lens, at which a color change occurs upon switching between the image A and the image D, an image strip Ai, an image strip Ei, an image strip Di, and an image strip Ei respectively extracted, in the form of a stripe, from the corresponding positions in the images A, D, and E are arrayed, as shown in FIG. 12.

In the lenticular display of the embodiment described above, only the display image A or the display image D is displayed depending on the observation angle. There is also an angle at which an overlapped image of the display image A and the interpolation image E is displayed and an angle at which an overlapped image of the display image A and the interpolation image E is displayed, but there is practically or absolutely no angle at which an observer has a difficulty in recognizing letters due to about fifty-fifty blend of the display image A and the display image D. Therefore, the legibility of the letters respectively included in the display images A and D can be improved.

Figure 13:
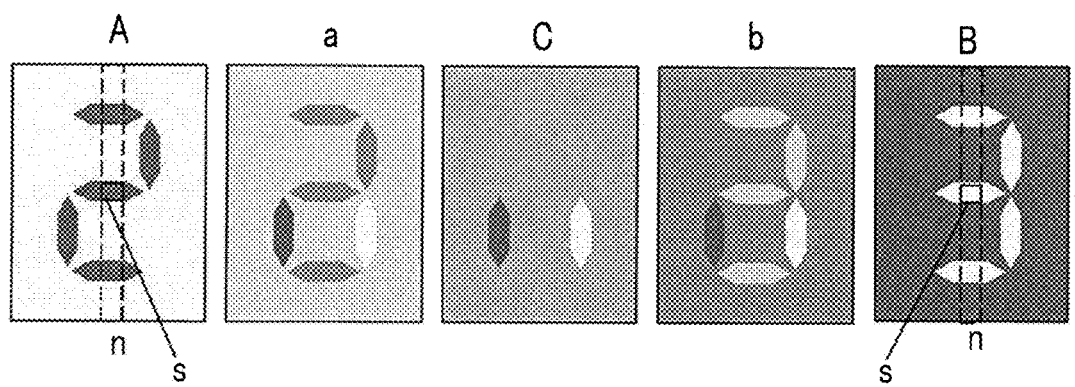
FIG. 13 is a schematic view showing an example of two display images to be separately displayed and three interpolation images produced from the two display images in another example of the lenticular display according to the present disclosure.
Figure 14:
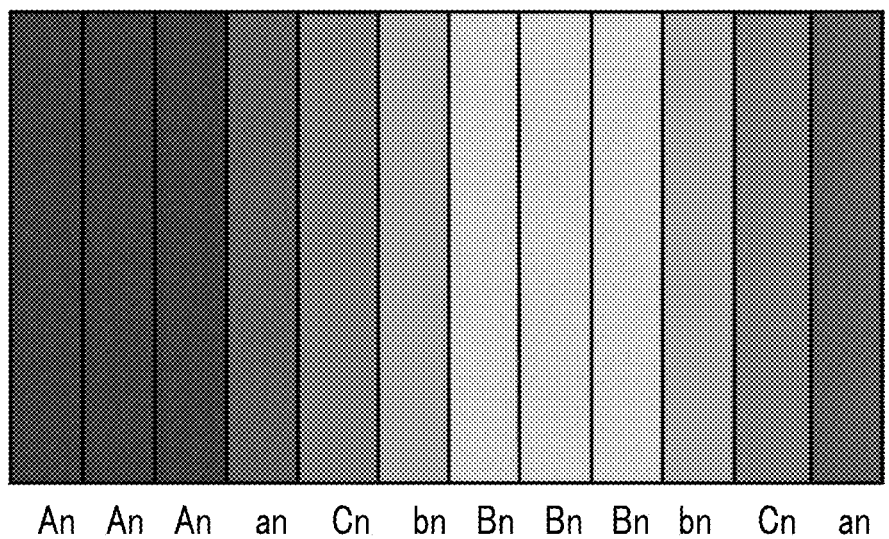
FIG. 14 is a schematic view showing an example of an image strip group in the region indicated by S in FIG. 13.
Figure 15:
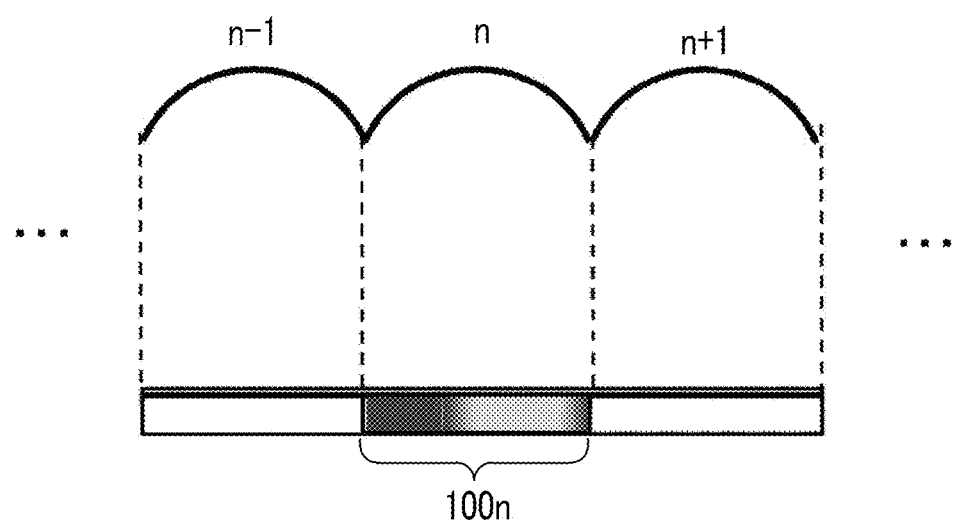
FIG. 15 is a schematic view showing an example of the structure in a thickness direction of the lenticular display including the image strip group (the interlaced image strip group for one lens) shown in FIG. 14.
Figure 16:
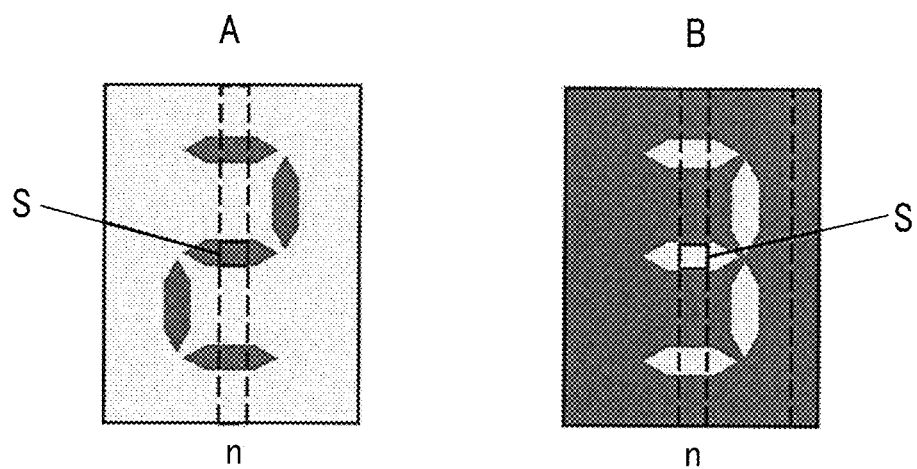
FIG. 16 is a schematic view showing two display images to be separately displayed in an example of a conventional lenticular display.
Figure 17:
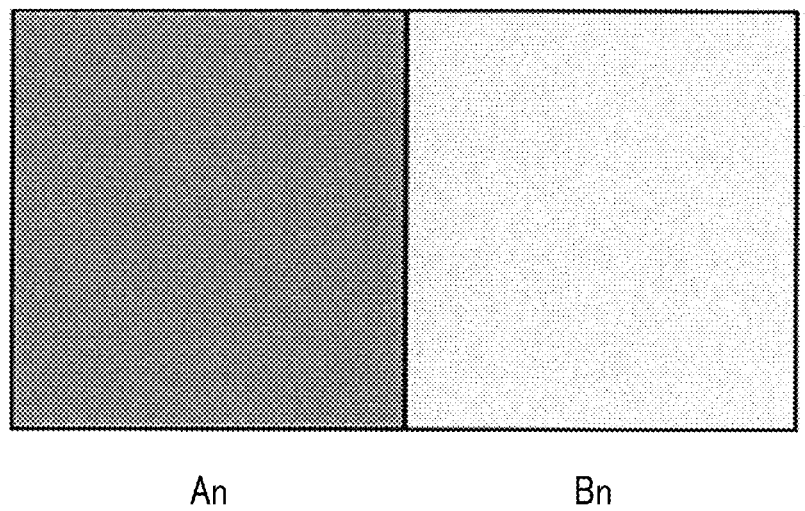
FIG. 17 is a schematic view showing an example of an image strip group in the region indicated by S in FIG. 16.
Figure 18:
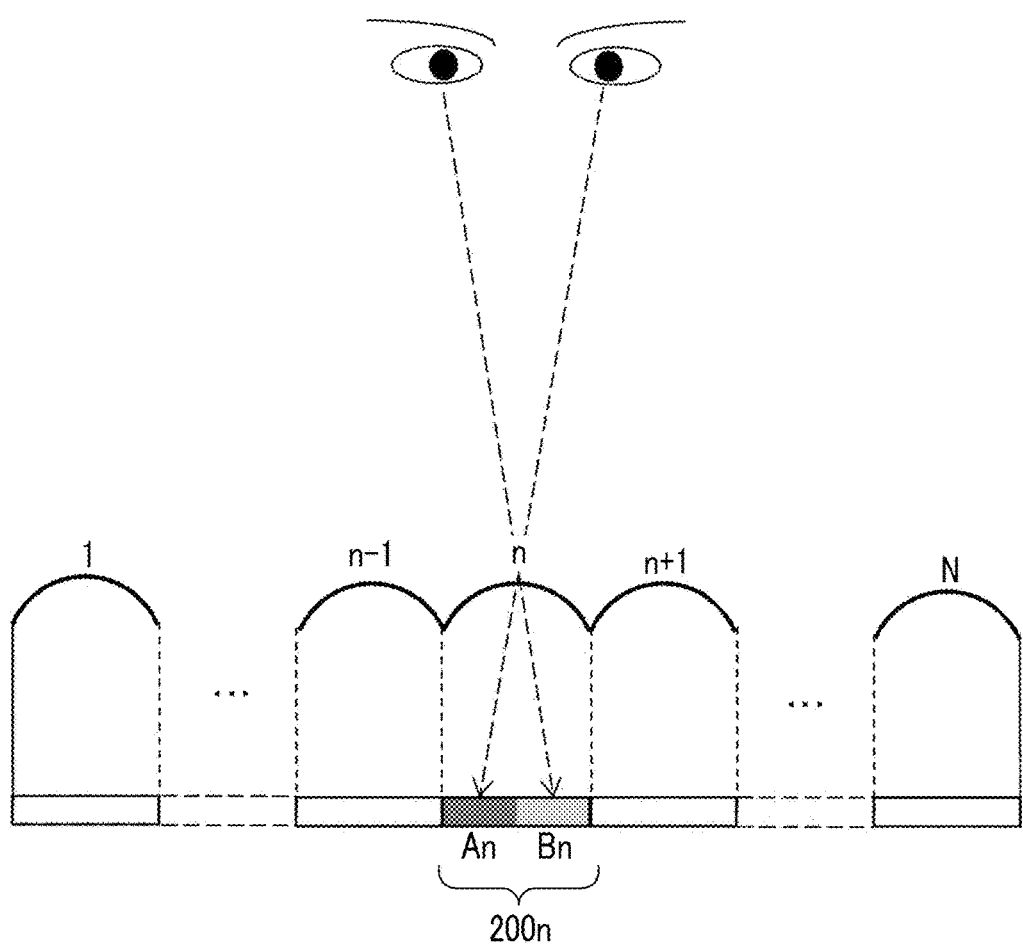
FIG. 18 is a schematic view showing an example of the structure in a thickness direction of the conventional lenticular display including the image strip group shown in FIG. 17.

FIG. 13 is a schematic view showing an example of three interpolation images made from two display images. FIG. 14 is a schematic view showing an image strip group in the region indicated by S in FIG. 13. FIG. 15 is a schematic view showing an example of the structure in a thickness direction of the lenticular display including the image strip group 100n shown in FIG. 14, but illustration of some portions is omitted.

Similarly to the display images A and B shown in FIG. 8, the display images A and B shown in FIG. 13 differ from each other in the color of the letter and the background color, and a large image change occurs except for portions of the letters included in the images A and B.

All of interpolation images a, C, and b are made based on the two display images A and B, and the color stepwise changes therebetween in a position where there is a color change between the display images A and B. Specifically, in terms of each of hue, brightness, and chroma, the interpolation image a is closer to the display image A than to the display image B, the interpolation image b is closer to the display image B than to the display image A, and the interpolation image C is in between the display image A and the display image B.

Under the n-th convex lens in the lenticular display according to the present embodiment, three interpolation image strips an, Cn, and bn having stepwise changed colors (interpolation colors) are disposed in parallel between the interpolation image strips An and Bn, which are respectively extracted by dividing the two display images A and B in the form of a stripe, as shown in FIG. 14 (that is, an interlaced image strip group is disposed). The interpolation image strips an, Cn, and bn are image strips respectively extracted by dividing the interpolation images a, C, and b shown in FIG. 13 in the form of a stripe in their respective corresponding positions.

Also, under other convex lenses, image strip groups respectively extracted from the display images A and B and the interpolation images a, C, and b corresponding to their respective positions are similarly disposed in parallel. In a case where the plurality of interpolation image strips an, Cn, and bn having colors stepwise changing in a direction from the color of one of the adjacent display image strip An to the color of the other display image strip Bn are disposed in parallel, it is possible to more reliably reduce overlapped displaying of the image A and the display image B, and to improve the legibility of the letter included in each of the display images A and B. Furthermore, the effect of causing gradual switching between the display image A and the display image B (morphing) can be markedly exhibited.

In a case where a plurality of interpolation image strips (that is, an interpolation image array) are arrayed in parallel between display image strips adjacent to each other, the same interpolation image strips may be arrayed in parallel. However, from the viewpoint of providing the morphing effect, it is preferable to array a plurality of interpolation image strips an, Cn, and bn having stepwise changed colors in parallel between the display image strip An and the display image strip Bn, such that the interpolation image strip has a color closer to the color of the display image strip that is nearer to the interpolation image strip, as shown in FIGS. 13 and 14.

The number of interpolation image strips disposed between the adjacent display image strips An and Bn is not limited. For example, interpolation image strips (for example, the interpolation image strips an and bn shown in FIG. 14) made from two out of three kinds of interpolation images a, C, and b shown in FIG. 13 may be arrayed.

Although four or more interpolation image strips may be arrayed, the larger the region occupied by the interpolation image strips under one convex lens, the narrower the region in which the display image strips An and Bn are arrayed. As a result, the resolution of the display images A and B deteriorates, and when the lenticular display is observed from various directions, the angle at which only the display image A or the display image B is observed is narrowed.

From the viewpoint described above, regardless of the number of interpolation image strips arrayed under one convex lens, the proportion of the region occupied by the interpolation image strips in the width direction of one convex lens is preferably equal to or lower than 34%, and more preferably equal to or lower than 17%.

The lenticular display according to the present disclosure is also effective for images having a high change rate, and can improve the legibility of a letter, in particular.

EXAMPLES

Hereinafter, the present invention will be more specifically described based on examples, but the present invention is not limited to the following examples.

(Preparation of Lenticular Display)

In an image strip group in which twelve image strips are arrayed under one lens, first display image strips were arrayed as the second to sixth strips, second display image strips were arrayed as the eighth to twelfth strips, and interpolation image strips were arrayed as the first and seventh strips, thereby preparing a lenticular image. For each of the image strips, a constitution was adopted such that, based on the color solid of the Munsell color system, the first display image strips and the second display image strips had different colors, and the interpolation image strips had an interpolation color that was in between the color of the first display image strips and the color of the second display image strips.

The lenticular image was formed on a surface of paper, and a lenticular lens was disposed on the lenticular image with a transparent adhesive layer disposed therebetween, such that the image strip group having the aforementioned configuration was disposed for each lens of the lenticular lens, thereby preparing a lenticular display.

(Evaluation of Visibility)

With respect to the lenticular display prepared as above, ten women in their twenties observed image changes while inclining the lenticular display. The number of women who did not feel a difficulty in recognizing the image was taken as the number of women who gave a passing score. When the number of women who gave a passing score regarding visibility is 4 or greater, image recognizability is considered excellent.

The colors of the image strips and the evaluation results are shown in the following Tables 1 to 3.

TABLE 1

|  | Shade of red | | | | | |
| --- | --- | --- | --- | --- | --- | --- |
|  | Example 1 | Example 2 | Example 3 | Example 4 | Example 5 | Example 6 |
| Color of first display image strip | 5R4/14 | 5R4/14 | 5R4/14 | 5R5/18 | 2.5R5/14 | 7.5R5/12 |
| Color of interpolation image strip | 5R6/6 | 5R4/8 | 5R5/12 | 5R6/3, 5R5/8 | 2.5R7/8 | 7.5R5/10 |

TABLE 1-continued

| | Shade of red | | | | | |
|---|---|---|---|---|---|---|
| | Example 1 | Example 2 | Example 3 | Example 4 | Example 5 | Example 6 |
| Color of second display image strip | 2.5Y9/1 | 2.5Y8.5/1 | 2.5Y8/1 | 2.5Y9/1 | 2.5Y9/1 | 2.5Y9/2 |
| Number of people giving passing score regarding visibility (sensory evaluation) | 9 | 8 | 5 | 10 | 8 | 5 |

TABLE 2

| | Shade of green | | | | | |
|---|---|---|---|---|---|---|
| | Example 7 | Example 8 | Example 9 | Example 10 | Example 11 | Example 12 |
| Color of first display image strip | 2.5G8/12 | 2.5G8/12 | 2.5G8/12 | 7.5G8/10 | 10G8/10 | 5G7/10 |
| Color of interpolation image strip | 2.5G9/6 | 2.5G9/8 | 2.5G9/2 | 2.5G9/6, 2.5G9/8, 2.5G8/10 | 10G9/4 | 10G9/4 |
| Color of second display image strip | 2.5Y9/1 | 2.5Y8.5/1 | 2.5Y8/1 | 2.5Y9/1 | 2.5Y9/1 | 2.5Y8.5/3 |
| Number of people giving passing score regarding visibility (sensory evaluation) | 9 | 8 | 5 | 10 | 8 | 5 |

TABLE 3

| | Shade of blue | | | | | |
|---|---|---|---|---|---|---|
| | Example 13 | Example 14 | Example 15 | Example 16 | Example 17 | Example 18 |
| Color of first display image strip | 5PB6/14 | 5PB6/14 | 5PB6/14 | 5PB7/14 | 2.5PB6/10 | 5B8/8 |
| Color of interpolation image strip | 5PB8/6 | 5PB7/10 | 5PB6/12 | 5PB8/6, 5PB7/10 | 2.5PB7/8 | 5B9/2 |
| Color of second display image strip | 2.5Y9/1 | 2.5Y8.5/1 | 2.5Y8/1 | 2.5Y9/1 | 2.5Y9/1 | 2.5Y8.5/2 |
| Number of people giving passing score regarding visibility (sensory evaluation) | 9 | 8 | 5 | 10 | 8 | 5 |

Hitherto, embodiments of the present disclosure have been described, but the present invention is not limited to the embodiments.

For example, a region in which no color change occurs upon switching between the display images in accordance with the viewing angle, such as a region in the display images A and D shown in FIG. 11 in which a letters is not disposed under the convex lens, does not show color changes. Accordingly, an interpolation image strip disposed between the adjacent display image strips has the same color as the display image strips. Therefore, the region in which no color change occurs upon switching between the display images does not have a change resulting from the interpolation image strip, and the provision of an interpolation image strip between the adjacent display image strips may be omitted.

In all of the embodiments described above, a case where two display images are displayed was described. However, the present disclosure can also be applied to a case where three or more display images are displayed by one lenticular display. For example, in a case where three display images are displayed, display image strips respectively extracted in the form of a stripe from three display images are arrayed adjacently to each other for each convex lens in their respective corresponding positions. Furthermore, an image strip group may be prepared in which an interpolation image strip is disposed between display image strips that are adjacent to each other, that are extracted from different display images, and that have different colors in at least a portion thereof, the interpolation image strip having a color (interpolation color) that is in between the color of one of the adjacent display image strips and the color of the other of the adjacent display image strips.

On an opposite surface (rear surface) of the lenticular image from a side on which the lenticular lens is disposed, a protective layer for protecting the lenticular image may be provided. Examples of the protective layer include paper, a resin film, a metal sheet, styrofoam, and the like. The protective layer may be provided by coating the rear surface of the lenticular image with paint and drying it.

The entire disclosure of JP2015-074481 filed on Mar. 31, 2015 is incorporated into the present specification by reference.

All of the publications, patents, patent applications, and technical standards described in the present specification are incorporated herein by reference, to the same extent as if each individual publication, patent, patent application, or technical standard was specifically and individually indicated to be incorporated by reference.

What is claimed is:

1. A lenticular display comprising:
    a lenticular lens including a plurality of convex lenses that each have a semicylindrical surface and are arrayed in parallel; and
    a lenticular image disposed on an opposite side of the convex lenses from the semicylindrical surface,
    wherein the lenticular image includes:
    a plurality of display image strips that are respectively extracted in the form of a stripe from a plurality of display images and arrayed under the convex lenses in their respective corresponding positions, and
    a plurality of interpolation image strips, each interpolation image strip disposed between display image strips that are adjacent to each other, the adjacent display image strips being extracted from different display images, being included in the plurality of display image strips, and having mutually different colors in at least a portion thereof, wherein, in a position where colors of the adjacent display image strips are different from each other, the interpolation image strip between the adjacent display image strips has a color that is in between a color of one of the adjacent display image strips and a color of the other of the adjacent display image strips in the Munsell color system,
    wherein the plurality of interpolation image strips are disposed such that each of hue, brightness and chroma elements, constituting the Munsell color system, changes stepwise, in a direction from the color of the one of the adjacent display image strips to the color of the other of the adjacent display image strips.

2. The lenticular display according to claim 1, wherein the interpolation image strip comprises an interpolation image strip in which each of hue, brightness, and chroma as elements constituting the Munsell color system is in between those of the respective colors of the adjacent display image strips.

3. The lenticular display according to claim 1, wherein the plurality of display images each include a letter.

4. The lenticular display according to claim 1, wherein a plurality of interpolation image strips are arrayed such that each of the interpolation image strips has a color closer to the color of the display image strip that is nearer to the interpolation image strip.

5. A method for forming a lenticular image, comprising:
    a step of making an image strip group, the step of making an image strip group comprising:
    adjacently disposing display image strips that are respectively extracted in the form of a stripe from a plurality of display images in their respective corresponding positions; and
    disposing an interpolation image strip between display image strips that are adjacent to each other, the adjacent display image strips being extracted from different display images, and having different colors in at least a portion thereof, the interpolation image strip having a color that is in between a color of one of the adjacent display image strips and a color of the other of the adjacent display image strips in the Munsell color system,
    wherein the plurality of interpolation image strips are disposed such that each of hue, brightness and chroma elements, constituting the Munsell color system, changes stepwise, in a direction from the color of the one of the adjacent display image strips to the color of the other of the adjacent display image strips.

6. The method for forming a lenticular image according to claim 5, wherein the interpolation image strip comprises an interpolation image strip in which each of hue, brightness, and chroma as elements constituting the Munsell color system is in between those of the respective colors of the adjacent display image strips.

7. The method for forming a lenticular image according to claim 5, wherein the plurality of display images each include a letter.

8. A method for manufacturing a lenticular display, comprising:
    a step of forming a lenticular image on a surface of a recording medium by the method according to claim 5; and
    a step of bonding a surface of the recording medium on which the lenticular image has been formed and a surface of a lenticular lens including a plurality of convex lenses that each have a semicylindrical surface and are arrayed in parallel, the surface of the lenticular lens being at an opposite side from the semicylindrical surface.

9. A method for manufacturing a lenticular display, comprising:
    a step of forming a lenticular image by the method according to claim 5, on a surface of a lenticular lens including a plurality of convex lenses that each have a semicylindrical surface and are arrayed in parallel, the surface of the lenticular lens being at an opposite side from the semicylindrical surface of the convex lenses.

10. The method for forming a lenticular image according to claim 5, wherein a plurality of interpolation image strips are arrayed such that each of the interpolation image strips has a color closer to the color of the display image strip that is nearer to the interpolation image strip.

* * * * *